(12) United States Patent
Vachhani

(10) Patent No.: US 8,649,782 B2
(45) Date of Patent: Feb. 11, 2014

(54) METHOD AND APPARATUS FOR REDIRECTING MOBILE COMMUNICATIONS

(75) Inventor: Ajay Vachhani, Bhopal (IN)

(73) Assignee: NEC Corporation, Tokyo (JP)

( * ) Notice: Subject to any disclaimer, the term of this patent is extended or adjusted under 35 U.S.C. 154(b) by 752 days.

(21) Appl. No.: 12/451,661

(22) PCT Filed: May 28, 2008

(86) PCT No.: PCT/JP2008/060237
§ 371 (c)(1),
(2), (4) Date: Jan. 15, 2010

(87) PCT Pub. No.: WO2008/149867
PCT Pub. Date: Dec. 11, 2008

(65) Prior Publication Data
US 2010/0172288 A1 Jul. 8, 2010

(30) Foreign Application Priority Data
May 30, 2007 (GB) .................................. 0710329.4

(51) Int. Cl.
*H04M 3/42* (2006.01)
(52) U.S. Cl.
USPC ......... 455/417; 455/404.1; 455/453; 455/466

(58) Field of Classification Search
USPC ................ 455/404.1, 417, 453, 445, 466
See application file for complete search history.

(56) References Cited

U.S. PATENT DOCUMENTS

| 6,985,740 B2* | 1/2006 | Shyy et al. ............... 455/453 |
| 7,050,445 B1* | 5/2006 | Zellner et al. ........... 370/412 |
| 8,125,950 B2* | 2/2012 | Rofougaran et al. ..... 370/329 |
| 2007/0253328 A1* | 11/2007 | Harper et al. .......... 370/219 |
| 2007/0270152 A1* | 11/2007 | Nylander et al. ........ 455/445 |
| 2010/0103831 A1* | 4/2010 | Caldwell et al. ........ 370/252 |

FOREIGN PATENT DOCUMENTS

JP 2005-223447 8/2005

* cited by examiner

*Primary Examiner* — Temica M Beamer
(74) *Attorney, Agent, or Firm* — McGinn IP Law Group, PLLC

(57) ABSTRACT

A cellular communication system is capable of supporting local access points with shorter communication ranges than macro cells within which they are positioned. When a user wishes to send a communication a request is sent to an access point. At the access point a determination is made as to whether or not the maximum capacity of the access point has been reached. If maximum capacity has been reached then a rejection signal is sent to the user equipment and the communication is redirected into the macro cell in which the access point is positioned.

14 Claims, 4 Drawing Sheets

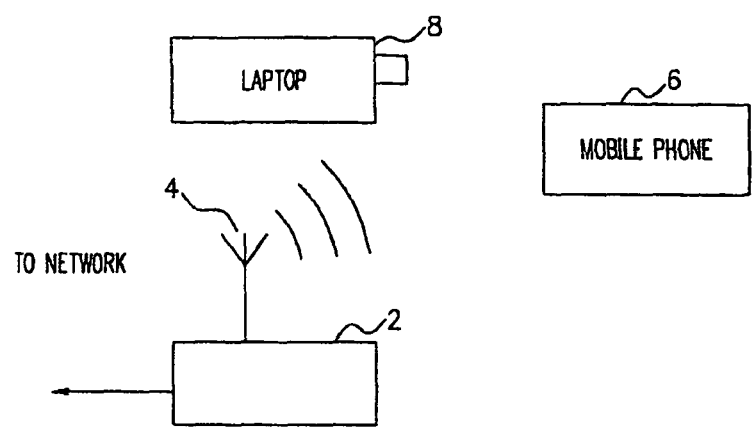
F I G. 1

F I G. 4
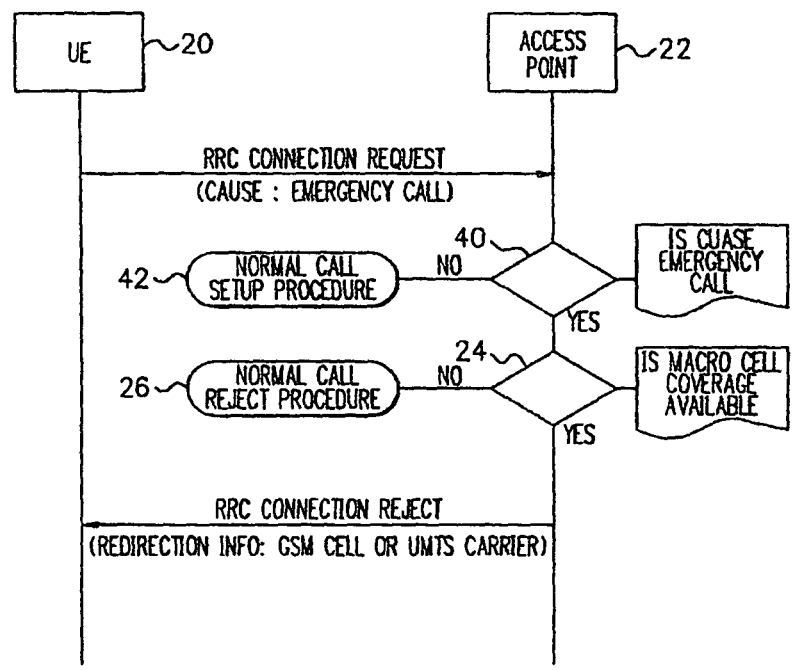

METHOD AND APPARATUS FOR REDIRECTING MOBILE COMMUNICATIONS

This invention relates to a method and apparatus for redirecting mobile communication requests made to an access point within a macro cell of a celluar network.

BACKGROUND OF THE INVENTION

Mobile communication systems operate on a cellular basis in which transmission and receiver base stations coupled to a network provide transmission and reception to user equipment (UE) such as mobile telephones in each cell in a network. There is usually a single base station in each cell. The base stations themselves are usually referred to as macro base stations and the cells as macro cells.

Smaller cell sites called Pico cells have been proposed. These cover a smaller area such as a complex of buildings. Still smaller cell sites named FEMTO cells are also proposed. This is a term used by mobile operators to refer to cell sites of the type which attempt to solve the often expensive problem of providing complete in building coverage. PICO cells can have problems with low or multi-path distortion etc when they are used to provide coverage to a complete building.

A FEMTO cell is often referred to as an access point/home gateway. It is a small plug and play device which communicates with user equipment such as mobile handsets using standard 2G or 3G transmission reception. It is connected to the celluar network via a broadband service using either Xdsl (digital subscriber loop) or Wimax Technology. Optionally a FEMTO cell can incorporate the functionality of a broadband router so that a user has a completely integrated device. It is of course essential that it integrates seamlessly with the core network of the mobile communication system so that it can be remotely managed and updated.

These access points have limited bandwidth and therefore are only able to cope with a limited number of connections from mobile communication devices before the band width is exceeded. Thus, for example, an access point may have a capacity of ten voice calls which it may handle simultaneously. It is therefore possible that access points can quickly reach their capacity in terms of the calls they can handle and when this happens other users are not able to make calls.

It will be appreciated that it is necessary for an access point to be able to support emergency calls. This is because when an emergency call is made it is important that a user of a mobile communication device can advise the emergency services of his location. As FEMTO cells are deployed in an unregulated and uncoordinated manner, the knowledge of the location of a particular FEMTO cell in which a user is located will not be information which is known to the network and therefore it is important to speak to the person reporting an emergency.

SUMMARY OF INVENTION

Preferred embodiments of the present measure provide a method and apparatus to redirect a communication request to a macro cell when an access point has already reached its maximum capacity for calls.

Preferably embodiments sending a signal back to the piece of UE making the request from the access point advising that perhaps the threshold has been reached, and redirecting the call to a macro cell.

The message that the capacity threshold has been reached may be an SMS text message. In such a case, if a subscriber wishes the call to be redirected to a macro cell he/she again places the call request which is then redirected to on available 2G or 3G Macro cell.

BRIEF DESCRIPTION OF THE DRAWINGS

Preferred embodiments of the invention will now be described in detail by way of example with reference to the accompanying drawings in which:

FIG. 1 shows schematically a 3G access point such as a FEMTO cell in communication with a number of pieces of user equipment;

DETAILED DESCRIPTION OF PREFERRED EMBODIMENT

FIG. 1 shows an access point 2 which is coupled to a network. This comprises an antenna 4 coupled to, or integrated into a controller and a transmit/receive unit. In the case of a FEMTO cell, this will cover a relatively small area such as a house. User equipment such as a mobile phone 6 or a laptop with a data card 8 may be within the house and therefore capable of communication with the access point 2. In a larger area such as an office environment there may be a number of different pieces of equipment capable of communicating with the access point 2. When a piece of user equipment initially comes into range of the access point 2, it registers with the access point as being a primary access point on the network for transmission and reception of data. Thus, when the user equipment next tries to communicate such as by making a telephone call, it will attempt to use the access point 2 to access the network.

As the access point is connected to the network typically by a conventional telephone line using a broadband connection (eg ADSL) and as it is meant to be user for residential coverage the total bandwidth (i.e. capacity to serve multiple simultaneous voice/Data cells) it is capable of supporting is considerably less than that of a base station in a macro cell in the network. It is after all designed to take communications from a localised area within a macro cell and will therefore never have been planned to be able to handle the requirements of the whole macro cell. If the access point is a home gateway device its maximum number of communications that it can handle simultaneously may be as little as 4, eg 4 simultaneous voice calls from different mobile telephones all registered with the access point. When the maximum number of possible devices using the access point is reached and another piece of user equipment or subscriber places a request to communicate via the access point, the access point then has to reject the request. This means that the subscriber cannot use the service.

In order to deal with this situation, the access point is configured to redirect a piece of user equipment which has its request rejected to use the macro cell within which the access point is positioned. However, this may be undesirable for some subscribers as higher rates may be payable in comparison to using an access point. Therefore, in a preferred embodiment of the invention, instead of redirecting and rejecting a request automatically, the system is configured to notify the subscriber that his request has been rejected such that he may chose to disallow the opportunity to have his request redirected to the macro cell.

Figure 2:
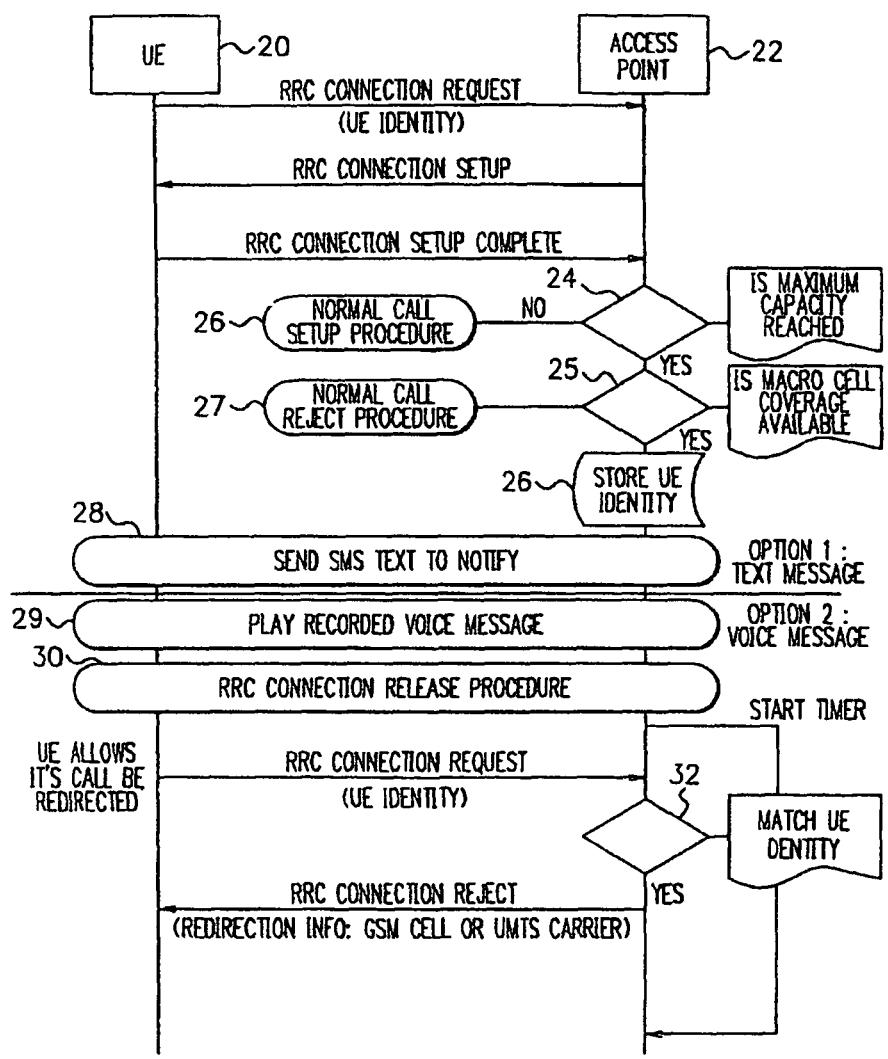
FIG. 2 shows a procedure which takes place when a piece of user equipment tries to make a call by an access point which has already reached capacity.

A flow diagram showing communications between a piece of user equipment 20 and an access point 22 is shown in FIG. 2. The description of this assumes that the user equipment 20 is already registered with the access point 22 and will attempt to use this for its communications.

When the user equipment wishes to make a communication such as a voice call via the access point 22 it first sends a radio resource control (RRC) connection request to the access point 22. The access point 22 and the user equipment 20 then perform an RRC connection set up which will initially establish this contact between the user equipment 20 and the access point 22. A determination is then made at 24 as to whether or not the access point has reached maximum capacity. If it has not, then the normal call set up procedure between the user equipment 20 and access point 22 is performed at 26. This does not form the subject matter of the present invention and is therefore not described here. It will be well known to those skilled in the art.

If maximum capacity has been reached then a determination is made at 25 as to whether macro cell coverage is available. If it is not then a call rejection procedure will be performed at 27. If macro cell coverage is available then the access point 22 stores the identity of the user equipment which has made the request at 26. The access point 22 then sends a SMS message to the user equipment 20 at 28 or a voice message at 29 to notify a subscriber that the call request has been rejected and should he/she wish to again place the call request it will be directed to the macro cell. The user equipment 20 and the access point 22 can then perform an RRC connection release procedure at 30. This disconnects the user equipment from the access point 22. A redirection procedure can then be selected by the subscriber on his user equipment. In this, he sends a further RRC connection request to the access point 22. At the same time the access point has started a timed period during which it will in response to an RRC connection request from that piece of the attempt to match the user identity of the user making the RRC connection request with the user identity stored at 26. This is done at 32. If the user identity is matched, the RRC connection request is rejected and "redirection information" (which contains the GSM Cell information and UMTS frequency Information) is sent back to the user equipment. In response to this, the software running in user equipment redirects the call into the appropriate macro cell using, for example, the GSM or UMTS frequency band as specified in "Redirection information".

It will be appreciated from the above that the user equipment is configured to respond to an RRC connection request which includes "redirection information" to transmit the call into the appropriate macro cell. This functionality can be implemented in software in a piece of user equipment by those skilled in the art.

The procedures described above can be used with all 3GPP Release99 and future release compliant handsets.

Figure 3:
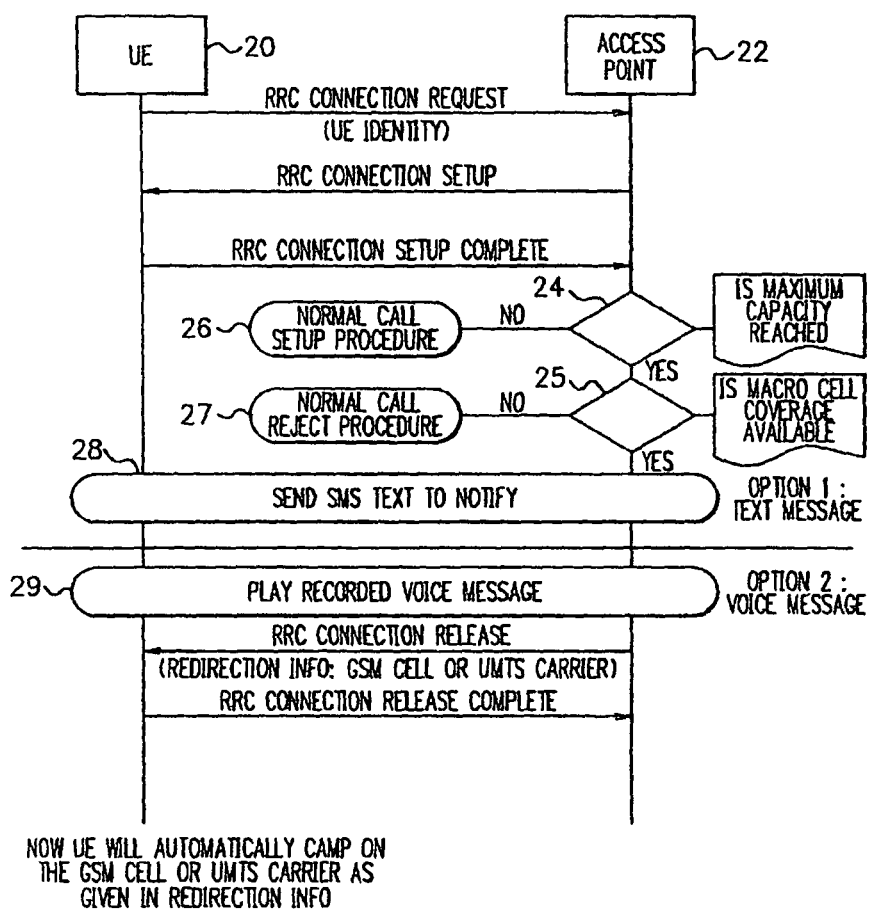
FIG. 3 shows an alternative procedure to that of FIG. 2 in a further embodiment of the invention; and, FIG. 4 shows the procedure when a user tries to make an emergency call

A flow diagram showing the events which take place in a system using 3GPP Release6 and above compliant handsets is shown in FIG. 3. The first part of the procedure between the user equipment and access point 22 is the same as that described in relation to FIG. 2 as far as the determination as to whether or not the maximum capacity of the access point has been reached at 24. If maximum capacity has not been reached, then the normal call set up procedure is entered at 26. If it has been reached, then the access point sends an SMS message at 28 to the user equipment 20 to notify it of the connection rejection or sends a voice message at 29. The access point 22 then commences a RRC connection release procedure with the user equipment 20 which causes the user equipment 20 to automatically register with the relevant macro cell, the information for which may be provided in the "redirection information". The user can then make his call via the macro cell. It is assumed in FIG. 3 and FIG. 4 that macro cell coverage (either GSM or UMTS) is available. If it is not then obviously the redirection procedure cannot be initiated by Access Point. As in the previous embodiment, the system can be configured such that no SMS message is sent by the access point to the user equipment whereby the user equipment will automatically try to use the macro cell if the connection request is rejected.

FIG. 4 shows a modification of the system which can be used with the systems of either FIG. 2 of FIG. 3. In this, if the user equipment tries to make an emergency call by using a recognised emergency number (eg 999 in the United Kingdom) the user equipment instantly sets up an RRC connection request to the access point 22. A determination is made at 40 as to whether or not the connection request is for an emergency call or not by checking the "cause value" specified in RRC CONNECTION REQUEST message. If it is not, then it can enter normal set up procedure at 42. This will entail going through the process of FIG. 2 or FIG. 3 to determine whether or not the access point has reached its maximum capacity. If the call is an emergency call, a determination is made at 44 as to whether or not macro cell coverage is available. If it is not, then the normal call set up procedure is entered at 26. This is equivalent to the normal call set up procedure of FIGS. 2 and 3. If macro cell coverage is available, it is preferable for the call to be routed via the macro cell and therefore an RRC connection rejection is sent back to the user equipment 20 with redirection information for the relevant macro cell. The user equipment is configured to respond automatically to this to redirect the call to the macro cell, thereby ensuring that the emergency call is made.

In order to implement the above embodiments, an access point must be arranged to check whether or not its maximum capacity limit has been reached and thus be capable of notifying user equipment about the status of maximum capacity and the possibility of redirection to a macro cell. The access point must be able to determine if macro cell coverage is available. User equipment must be configured to be able to redirect the calls to the macro cell, either using data already stored in the user equipment or data provided by the access point when a RRC connection request is rejected. For emergency call handling the access point must be able to determine whether or not an emergency call has been made and be able to redirect the emergency call to the macro cell if macro cell coverage is available. All these function can be implemented in software in the user equipment and the access point in a manner that will be well known to those skilled in the art.

The invention claimed is:

1. A method for redirecting communication requests made by a user equipment to an access point in a cellular communication system, wherein an access point of a femtocell in the cellular communication system has a shorter communication range than an access point of a macro cell in the cellular communication system, the method comprising:
   sending a communication request from the user equipment to the access point of the femtocell;
   determining whether the access point of the femtocell has reached a maximum capacity;
   sending a communication rejection signal to the user equipment if the access point of the femtocell has reached the maximum capacity; and redirecting the communication request into the access point of the macro cell.

2. The method according to claim 1, wherein the communication rejection signal comprises an SMS (Short Message Service) message in response to which a user may select whether or not the communication should be redirected into the macro cell.

3. The method according to claim 1, further comprising:
determining whether or not the communication request for a call to be made is for an emergency call;
determining whether or not macro cell coverage is currently available; and
redirecting the call to a macro cell if a result of the determination is that the call comprises an emergency call, and the macro cell coverage is available.

4. The method according to claim 1, wherein the communication rejection signal comprises a voice message which is played back to a user and in response to which the user may select whether or not the communication should be redirected to the macro cell.

5. The method according to claim 2, the method further comprising determining whether or not the macro cell coverage is available prior to sending the communication rejection.

6. The method according to claim 1, the method further comprising:
storing an identity of a user who has had a connection request rejection when the maximum capacity has been reached; and
setting a time limit for a connection request to be redirected to a macro cell.

7. A system for redirecting communication requests made by a user equipment to an access point in a cellular communication system, wherein an access point of a femtocell in the cellular communication system has a shorter communication range than an access point of a macro cell in the cellular communication system, the system comprising:
a unit that sends a communication request from the user equipment to the access point of the femtocell;
a unit that determines whether the access point of the femtocell has reached a maximum capacity;
a unit that sends a communication rejection signal to a user if the access point of the femtocell has reached the maximum capacity; and
a unit that redirects the communication request into the access point of the macro cell.

8. The system according to claim 7, wherein the communication rejection signal comprises an SMS (Short Message Service) message in response to which the user may select whether or not the communication should be redirected into the macro cell.

9. The system according to claim 7, the system further comprising:
a unit that determines whether the communication request for a call to be made is for an emergency call;
a unit that determines whether a macro cell coverage is available; and
a unit that redirects the call to a macro cell if a result of the determination is that the macro cell coverage is available.

10. The system according to claim 7, wherein the communication rejection signal comprises a voice message which is played back to the user and in response to which the user may select whether or not the communication should be redirected to the macro cell.

11. The system according to claim 8, the system further comprising a unit that determines whether a macro cell coverage is available before the unit sends the communication rejection signal.

12. The system according to claim 7, the system further comprising:
a unit that stores an identity of a user who has had a connection rejected when a maximum capacity has been reached; and
a unit that sets a time limit for a connection request to be redirected to a macro cell.

13. An access point of a macro cell of a cellular communication system, the access point comprising:
a unit that receives communication requests from a user equipment;
a unit that determines whether an access point of a femtocell, in the unit that receives the communication requests, has reached a maximum capacity;
a unit that sends a communication rejection signal to a user if the maximum capacity has been reached; and
a unit that sends data to the user to redirect a communication into the macro cell, the access point of the femtocell having a shorter communication range than the access point of the macro cell in the system.

14. A cellular communication device in which an access point of a femtocell in the cellular communication device has a shorter communication range than an access point of a macro cell in the cellular communication device, the cellular communication device comprising:
a unit that sends a communication request from a user equipment to the access point of the femtocell;
a unit that determines whether the access point of the femtocell has reached a maximum capacity;
a unit that sends a communication rejection signal to the user equipment if the access point of the femtocell has reached the maximum capacity; and
a unit that redirects the communication request into the access point of the macro cell.

* * * * *